C. A. SECKINGER.
NUT LOCK.
APPLICATION FILED SEPT. 12, 1911.

1,061,873.

Patented May 13, 1913.

Witnesses:
Christ Feinle, Jr.

Inventor,
Charles A. Seckinger.
By Victor J. Evans,
Attorney.

UNITED STATES PATENT OFFICE.

CHARLES A. SECKINGER, OF KANSAS CITY, KANSAS.

NUT-LOCK.

1,061,873.

Specification of Letters Patent.

Patented May 13, 1913.

Application filed September 12, 1911. Serial No. 648,858.

*To all whom it may concern:*

Be it known that I, CHARLES A. SECK-INGER, a citizen of the United States, residing at Kansas City, in the county of Wyandotte and State of Kansas, have invented new and useful Improvements in Nut-Locks, of which the following is a specification.

This invention relates to nut locks and the object of the invention is the provision of a simple and efficient device of this character which will prevent the turning of the nut upon the bolt in either direction but which will permit the disconnection of the nut when necessary without any destruction of the nut and bolt and without any appreciable amount of trouble.

Further objects of the invention will appear as the following specific description is read in connection with the accompanying drawing, which forms a part of this application, and in which:—

Figure 1:
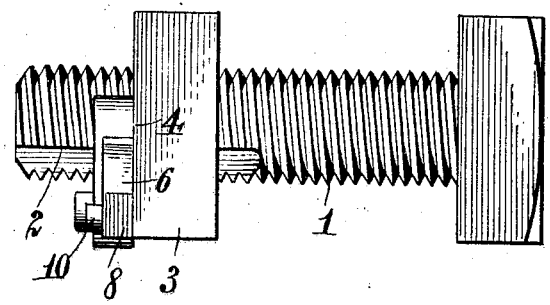
Figure 2:
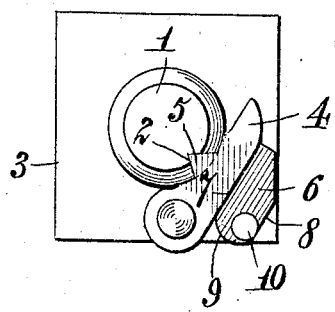

Figure 1 is a side elevation. Fig. 2 is a top plan view.

Referring more particularly to the drawing, 1 represents an ordinary bolt having a groove 2 which extends through a portion of its threaded shank. The nut is shown at 3 and pivoted thereon is a locking dog 4 having a projection 5 thereon to engage the groove 2 in the bolt. This dog is arranged in such a manner upon the nut that any attempt to unscrew the nut causes the thrust directly between one wall of the groove and the pivot pin of the dog 4. Therefore, any unscrewing of the nut would not cause the dog to be thrown to inoperative position.

In order to hold the dog 4 in operative position against movement away from the bolt there is pivoted upon the nut 3 a locking member 6, provided with opposite flat sides 7 and 8 and a cam end 9.

The member 6 is eccentrically mounted upon the pivot pin 10 so that, when the side 7 is arranged adjacent the outer side of the locking dog 4, the locking dog can have no movement away from the bolt but, when the side 8 is turned toward the locking dog, the locking dog will be free to move away from the bolt so that the projection 5 can be removed from the groove. The cam 9 acts to force the dog 4 into operative position when the locking member 6 is turned so as to bring the side 7 into engagement with the dog 4.

Having thus described the invention, what I claim as new is:—

A nut lock comprising a bolt having a longitudinal V-shaped recess, a nut threaded on the bolt, a locking dog pivoted at one side to the top of the nut and having a projection adapted to snugly fit in the recess, and a locking member eccentrically pivoted to same side on the top of the nut and adapted to throw the locking dog into engagement with the bolt and hold the same in a locking position, said locking member having a cam end adapted to force said locking dog into locking position and a flat side adapted to lie throughout its length against the dog when the nut is locked.

In testimony whereof I affix my signature in presence of two witnesses.

CHARLIE A. SECKINGER.

Witnesses:
BRUNO D. TAUBER,
CARL V. HERR.